United States Patent
Kim et al.

(10) Patent No.: US 11,307,381 B2
(45) Date of Patent: Apr. 19, 2022

(54) OPTICAL DEVICE AND DRIVING CONTROL METHOD OF OPTICAL DEVICE

(71) Applicant: HANWHA TECHWIN CO., LTD., Seongnam-si (KR)

(72) Inventors: Dae Bong Kim, Seongnam-si (KR); Young Sang Kwon, Seongnam-si (KR); Jae Goo Lee, Seongnam-si (KR); Young Mi Kim, Seongnam-si (KR); Hee Joong Han, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 193 days.

(21) Appl. No.: 16/496,238

(22) PCT Filed: Jun. 28, 2017

(86) PCT No.: PCT/KR2017/006804
§ 371 (c)(1),
(2) Date: Sep. 20, 2019

(87) PCT Pub. No.: WO2018/174341
PCT Pub. Date: Sep. 27, 2018

(65) Prior Publication Data
US 2020/0026025 A1 Jan. 23, 2020

(30) Foreign Application Priority Data
Mar. 23, 2017 (KR) .......................... 10-2017-0036918

(51) Int. Cl.
*G02B 7/10* (2021.01)
(52) U.S. Cl.
CPC .................................. *G02B 7/102* (2013.01)

(58) Field of Classification Search
CPC ...... G02B 7/102; G02B 15/14; G02B 15/146; G02B 15/167; G02B 15/27; G02B 15/16;
(Continued)

(56) References Cited

U.S. PATENT DOCUMENTS

| 5,144,492 A | 9/1992 | Iijima et al. |
| 9,172,884 B2 * | 10/2015 | Ohtani ................. G03B 13/34 |
| 2013/0050568 A1 * | 2/2013 | Adachi ................. G02B 7/102 |
| | | 348/345 |

FOREIGN PATENT DOCUMENTS

| JP | 2004-145028 A | 5/2004 |
| JP | 2006-227399 A | 8/2006 |

(Continued)

OTHER PUBLICATIONS

International Search Report (PCT/ISA/210), issued by International Searching Authority in corresponding International Application No. PCT/KR2017/006804, dated Dec. 22, 2017.

*Primary Examiner* — Kristina M Deherrera
(74) *Attorney, Agent, or Firm* — Sughrue Mion, PLLC (57) ABSTRACT

Provided is an optical device including an optics including at least two moving groups that are movable along an optical axis and share portions of driving regions; a plurality of actuators configured to move the at least two moving groups along the optical axis, respectively; and a control unit configured to control the positions of the at least two moving groups by operating the actuators, wherein the control unit moves the at least two moving groups independently, such that the position coordinates of the at least two moving groups in one integrated coordinates system do not coincide with each other.

13 Claims, 10 Drawing Sheets

(58) Field of Classification Search
CPC ................. G02B 13/009; G02B 15/20; G03B 2205/0046
USPC ................................................ 359/695, 698
See application file for complete search history.

(56) References Cited

FOREIGN PATENT DOCUMENTS

| | | |
|---|---|---|
| JP | 2008-164681 A | 7/2008 |
| JP | 2010-170084 A | 8/2010 |
| JP | 5393769 B2 | 1/2014 |
| JP | 2015-62055 A | 4/2015 |
| JP | 5855387 B2 | 2/2016 |

* cited by examiner

OPTICAL DEVICE AND DRIVING CONTROL METHOD OF OPTICAL DEVICE

TECHNICAL FIELD

The present invention relates to an optical device and a driving control method thereof, and more particularly, to an optical device including at least two moving groups sharing moving regions with each other and a driving control method thereof.

BACKGROUND ART

Recently, demands for miniaturization and high optical performance of image capturing devices, such as digital cameras, video cameras, and surveillance cameras, are increasing.

From among such image capturing devices, a zoom lens system included in an image capturing device having a zoom function includes a plurality of moving groups movable to perform zooming, and, during a zooming operation, the plurality of moving groups move along the optical axis based on information about positions according to zooming positions pre-stored in memory as data.

However, when a plurality of moving groups are included in a small image capturing device, the plurality of moving groups may interfere with one another during movements.

DESCRIPTION OF EMBODIMENTS

Technical Problem

One or more embodiments of the present invention provides an optical device capable of controlling two or more moving groups sharing moving regions with one another from colliding with one another and a driving control method for the optical device.

Solution to Problem

According to an aspect of the present invention, there is provided an optical device including an optics movable along an optical axis and including at least two moving groups that share portions of driving regions; a plurality of actuators configured to move the at least two moving groups along the optical axis, respectively; and a control unit configured to control the positions of the at least two moving groups by operating the actuators, wherein the control unit moves the at least two moving groups independently, such that the position coordinates of the at least two moving groups in one integrated coordinates system do not coincide with each other.

According to another aspect of the present invention, there is provided a driving control method of optical device, which includes an optics movable along an optical axis and including at least two moving groups that share portions of driving regions; a plurality of actuators configured to move the at least two moving groups along the optical axis, respectively; and a control unit configured to control the positions of the at least two moving groups by operating the actuators, the driving control method including calculating a relationship formula between position coordinates of the at least two moving groups in one integrated coordinates system; and moving each of the at least two moving groups by using the control unit, such that the position coordinates of the at least two moving groups do not coincide with each other.

Advantageous Effects of Disclosure

According to an embodiment of the present invention as described above, an optical device including at least two moving groups may be designed, such that moving regions of the moving groups are shared with one another for miniaturization of the optical device and a driving control method for the optical device may be provided.

Also, an optical device capable of preventing moving groups sharing moving regions with each other from colliding with each other during movements by integrating coordinates systems of the moving groups and a driving control method for the optical device may be provided.

BEST MODE

According to an aspect of the present invention, there is provided an optical device including an optics movable along an optical axis and including at least two moving groups that share portions of driving regions; a plurality of actuators configured to move the at least two moving groups along the optical axis, respectively; and a control unit configured to control the positions of the at least two moving groups by operating the actuators, wherein the control unit moves the at least two moving groups independently, such that the position coordinates of the at least two moving groups in one integrated coordinates system do not coincide with each other.

According to an embodiment, the optical device may further include a first moving group that does not share a driving region with the at least two moving groups and is movable along the optical axis.

According to an embodiment, the at least two moving groups may include a second moving group and a third moving group that are sequentially disposed toward an image with respect to the first moving group.

According to an embodiment, the position coordinates of the first moving group may be defined based on an independent coordinates system different from the integrated coordinates system.

According to an embodiment, the integrated coordinates system may refer to one coordinates system defining the position coordinates of the at least two moving groups.

According to an embodiment, the greater the difference in the position coordinates of the at least two moving groups, the physical distance between the at least two moving groups may increase.

According to an embodiment, the position coordinates of the second moving group in the integrated coordinates system may satisfy the following formula.

$$X_2 = X_3 \pm |\Delta W| \qquad \text{<Formula>}$$

here, X3 denotes a position coordinates of the third moving group in the integrated coordinates system, and $\Delta W$ denotes a difference between the position coordinates of the second moving group at the wide-angle end and the position coordinates of the third moving group at the far focus position.

According to an embodiment, the first moving group, the second moving group, and the third moving group may be a zoom lens group, a compensation lens group, and a focus lens group, respectively, and the optical device may further include a first fixed group that is disposed closest to an object and has a fixed position and a second fixed group that is disposed between the first moving group and the second moving group and has a fixed position.

According to an embodiment, the optical device may further include two moving groups that do not share a driving region with the at least two moving groups and are movable along the optical axis.

According to an embodiment, the position coordinates of the two moving groups that do not share driving regions with the at least two moving groups may be defined based on based on an independent coordinates system different from the integrated coordinates system.

According to another embodiment of the present invention, a driving control method for an optical device, the optical device comprising: optics including at least two moving groups movable in an optical axis direction and sharing a portion of a driving region; A plurality of actuators for moving the at least two moving groups in an optical axis direction, respectively; And a control unit for controlling the positions of the at least two moving groups by operating the actuators, wherein the driving control method comprises: deriving a relation between position coordinates of the at least two moving groups in one integrated coordinates system; And moving each of the at least two moving groups such that the position coordinates of the at least two moving groups do not coincide with each other using the control unit.

According to an embodiment, the optical device may further include a first moving group that does not share a driving region with the at least two moving groups and is movable along the optical axis.

According to an embodiment, the at least two moving groups may include a second moving group and a third moving group that are sequentially disposed toward an image with respect to the first moving group.

According to an embodiment, the calculating of the relationship formula between the position coordinates of the at least two moving groups may include calculating a difference $PI_d$ between a first reference position of the second moving group and a second reference position of the third moving group; obtaining a first movement amount $M_1$ while moving the third moving group from the second reference position to a far focal position; obtaining a second movement amount $M_2$ while moving the second moving group from the first reference position to a wide-angle end; calculating a difference $\Delta W$ between position coordinates of the second moving group and position coordinates of the third moving group from an formula $\Delta W = M_2 - (M_1 - PI_d)$; and calculating a relationship formula between the position coordinates of the second moving group and the position coordinates of the third moving group from the difference $\Delta W$.

According to an embodiment, the position coordinates of the second moving group and the position coordinates of the third moving group may satisfy the following formula.

$$X_2 = X_3 \pm |\Delta W| \qquad \text{<Formula>}$$

here, $X_2$ and $X_3$ denote position coordinates of the second moving group and position coordinates of the third moving group in the integrated coordinates system, respectively, and $\Delta W$ denotes a difference between the position coordinates of the second moving group at the wide-angle end and the position coordinates of the third moving group at the far focus position.

MODE OF DISCLOSURE

The present disclosure may include various embodiments and modifications, and embodiments thereof will be illustrated in the drawings and will be described herein in detail. However, this is not intended to limit the present disclosure to particular modes of practice, and it is to be appreciated that all changes, equivalents, and substitutes that do not depart from the spirit and technical scope of the inventive concept are encompassed in the present disclosure. In the description of the present disclosure, certain detailed explanations of the related art are omitted when it is deemed that they may unnecessarily obscure the essence of the present disclosure.

While such terms as "first," "second," etc., may be used to describe various elements, such elements must not be limited to the above terms. The above terms may be used only to distinguish one element from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Some embodiments may be described in terms of functional block components and various processing operations. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the invention may be implemented with any programming or scripting language such as C, C++, Java, assembler, or the like, with the various algorithms being implemented with any combination of data structures, objects, processes, routines or other programming elements. Functional blocks may be implemented in algorithms that are executed on one or more processors. Furthermore, the disclosure may employ any number of conventional techniques for electronics configuration, signal processing, and/or data processing. The words "mechanism", "element", "means", and "configuration" are used broadly and are not limited to mechanical or physical embodiments, but can include software routines in conjunction with processors, etc.

Figure 1:
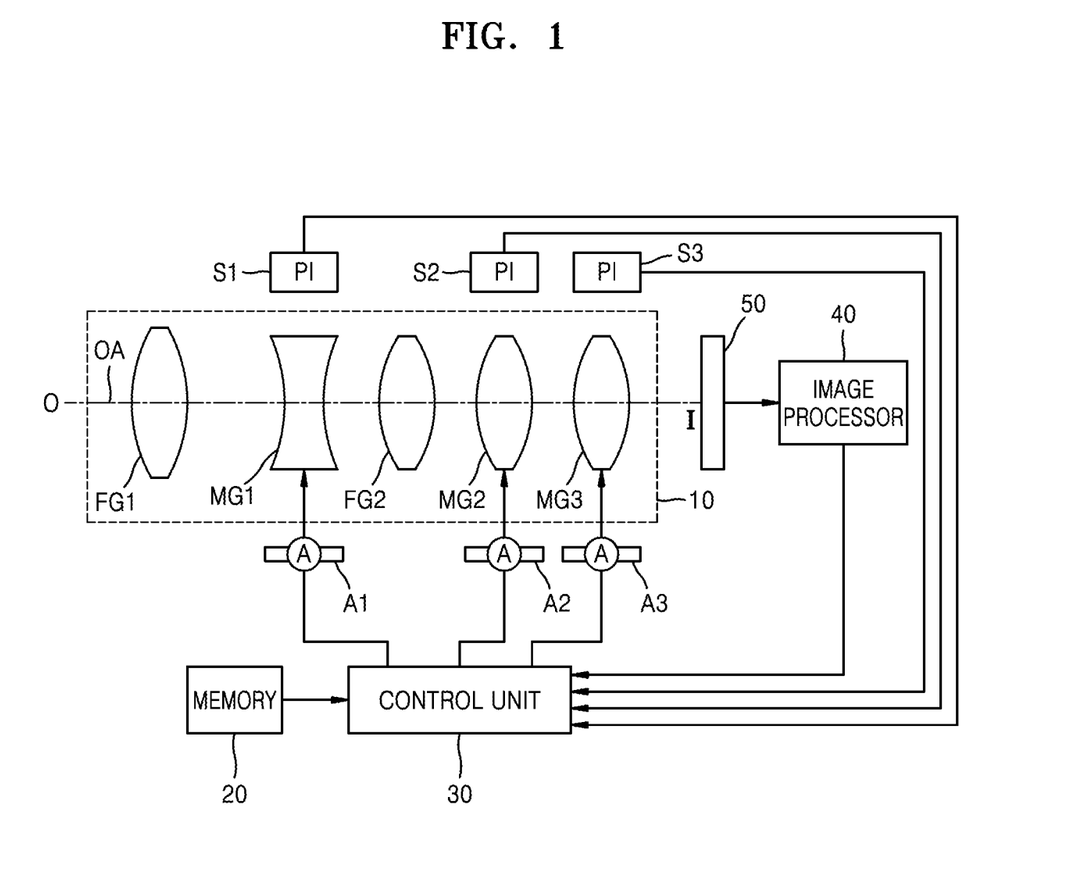
FIG. 1 is a schematic diagram showing an optical device according to an embodiment of the present invention.
Figure 2:
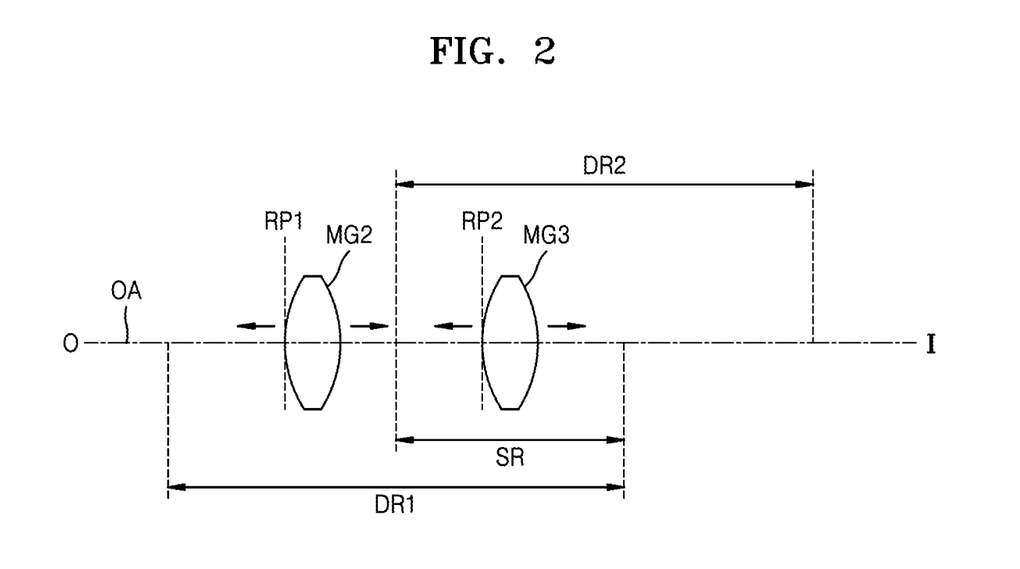
FIG. 2 is a diagram showing driving regions of a second moving group and a third moving group included in the optical device of FIG. 1.

FIG. 1 is a schematic diagram showing an optical device according to an embodiment of the present invention, and FIG. 2 is a diagram showing driving regions of a second moving group and a third moving group included in the optical device of FIG. 1.

Referring to FIG. 1, an optical device according to an embodiment includes an optics 10 including a first moving group MG1, a second moving group MG2, and a third moving group MG3 that are movable along an optical axis OA, a plurality of actuators A1, A2, and A3 for respectively moving the first to third moving groups MG1, MG2, and MG3 along the optical axis OA, and a control unit 30 for controlling positions of the first to third moving groups MG1, MG2, and MG3 by operating the actuators A1, A2, and A3.

The optical device further includes a memory 20 for storing data representing design positions of the first to third moving groups MG1, MG2, and MG3 according to zoom positions, and the control unit 30 may move the first to third moving groups MG1, MG2, and MG3 by using such data.

In a direction from an object O toward an image I, the optics 10 may include a first fixed group FG1 having a fixed position, and a first moving group MG1 arranged to be movable along the optical axis OA, a second fixed group FG2 having a fixed position, and a second moving group MG2 and a third moving group MG3 arranged to be movable along the optical axis OA, in the order stated. According to an embodiment, the first moving group MG1, the second moving group MG2, and the third moving group MG3 may be a zoom lens group, a compensation lens group, and a focus lens group, respectively. Each of five lens groups stated above may include a single lens or a plurality of lenses.

However, the configuration of the optics 10 of the present invention is not limited to the above-stated embodiment, and the optics 10 might not include the second fixed group FG2 or may further include fixed groups or moving groups in addition to the five lens groups. Also, the second moving group MG2 may be a focus lens group and the third moving group MG3 may be a compensation lens group.

Since the optics 10 included in the optical device according to an example embodiment includes the first fixed group FG1 having a fixed position closest to the object O, the optics 10 may be an inner-focus type in which a total track length is not changed by performing zooming. Here, the total track length refers to a distance from a object-side surface of a lens closest to the object O from among a single or a plurality of lenses included in the first moving group MG1 to a image surface of an image sensor 50.

The first moving group MG1, the second moving group MG2 and the third moving group MG3 may be driven by a first actuator A1, a second actuator A2 and a third actuator A3, respectively. The actuators A1, A2, and A3 may be various types of driving units and may each be, for example, a stepping motor, a voice coil motor, or the like.

It may be detected whether the first moving group MG1, the second moving group MG2, and the third moving group MG3 are located at reference positions by photo interrupter (PI) sensors S1, S2, and S3. However, the present invention is not limited thereto, and some or all of the PI sensors S1, S2 and S3 may be omitted depending on the types of the actuators A1, A2, and A3.

According to an embodiment, the optical device further includes the image sensor 50 for converting light that is reflected from the object O and incident through the optics 10 into an electrical signal, and the electrical signal converted by the image sensor 50 may be processed by an image processor 40.

The memory 20 stores data about positions of the first moving group MG1, the second moving group MG2, and the third moving group MG3 according to object distances and focal lengths, that is, zoom positions. Such data is referred to as zoom tracking data, and a focused state may be maintained by controlling the positions of the second moving group MG2 and the third moving group MG3 when the first moving group MG1, which is a zoom lens group, moves according to the zoom tracking data. The positions of the first to third moving groups MG1, MG2, and MG3 may be based on a object-side surface of a lens closest to the object O from among lenses included in each lens group. However, the present invention is not limited thereto, and the positions of the first to third moving groups MG1, MG2, and MG3 may be based on an image-side surface of a lens closest to the image I from among lenses included in each lens group along a direction passing through the PI sensors S1, S2, and S3.

The zoom tracking data may be compensated zoom tracking data obtained by compensating for zoom tracking data corresponding to design values of an optics by taking manufacturing errors of the optics and measurement errors of the PI sensors S1, S2, and S3 into account.

Referring to FIG. 2, the second moving group MG2 and the third moving group MG3 may share movable regions with each other. Reference positions RP1 and RP2 of the second moving group MG2 and the third moving group MG3 may be determined by PI sensors S2 and S3, and the second moving group MG2 and the third moving group MG3 may move toward the object O and the image I along the optical axis from the reference positions RP1 and RP2.

The second moving group MG2 and the third moving group MG3 may have a first driving region DR1 and a second driving region DR2 that may move along the optical axis OA, respectively. The first driving region DR1 and second driving region DR2 may include a shared region SR in which the first driving region DR1 and second driving region DR2 partially overlap.

In the optical device of the present invention, the second moving group MG2 and the third moving group MG3 share movable region, thereby reducing the overall length of the optics 10 and miniaturizing the optical device through such a configuration.

However, due to the presence of the shared region SR, the second moving group MG2 and the third moving group MG3 may collide with each other during movements. According to an embodiment, position coordinates of the second moving group MG2 and the third moving group MG3 are each determined based on one integrated coordinates system.

According to an embodiment, when the control unit 30 included in the optical device moves the second moving group MG2 and/or the third moving group MG3 to perform zooming or the like, the control unit 30 may control the positions of the second moving group MG2 and the third moving group MG3, such that the position coordinates of the second moving group MG2 and the position coordinates of the third moving group MG3 do not coincide with each other. Accordingly, the second moving group MG2 and the third moving group MG3 may be prevented from colliding with each other. Here, "coincide/coinciding" is not limited to having exactly the same value and may include values with a common tolerance or a certain margin.

Also, the same position coordinates of two lens groups does not mean that two lens groups arranged on the optical axis OA are at the exactly same physical position. Each lens group may include a single or a plurality of lenses, and thus may have a certain thickness.

As will be described later, during process of calculating a positional relationship between the second moving group MG2 and the third moving group MG3 in the integrated coordinates system, differences between position coordinates and physical positions due to the thickness(es) of the second moving group MG2 and/or the third moving group MG3 are already reflected. Therefore, the same position coordinates does not mean that the position of the most object-side surface of the second moving group MG2 is identical to the position of the most object-side surface of the third moving group MG3, but may mean that the most image-side surface of the second moving group MG2 and the most object-side surface of the third moving group MG3 contact each other.

According to an embodiment, the driving region of the first moving group MG1 does not overlap the moving region of the second moving group MG2 and the moving region of the third moving group MG3. Therefore, since the first moving group MG1 does not collide with the second moving group MG2 when the first moving group MG1 is moved, the position coordinates of the first moving group MG1 may be defined based on an independent coordinates system different from the integrated coordinates system of the second moving group MG2 and the third moving group MG3.

Hereinafter, a driving control method for the optical device will be described.

Figure 3:
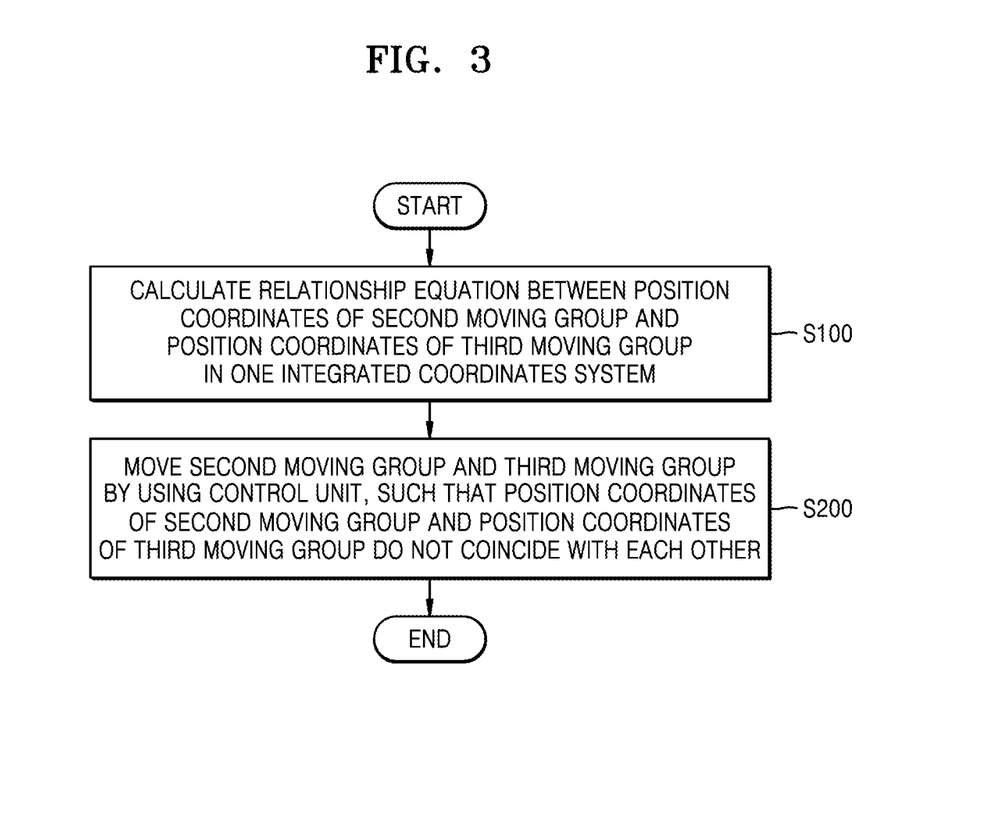
FIG. 3 is a flowchart of a driving control method of an optical device.

FIG. 3 is a flowchart of a driving control method for an optical device.

Referring to FIGS. 1 and 3, a driving control method for an optical device according to an embodiment may include operation S100 for newly establishing a relationship formula between a position coordinates of the second moving group MG2 and a position coordinates of the third moving group MG3 in one integrated coordinates system and operation S200 for moving the second moving group MG2 and the third moving group MG3, such that the position coordinates of the second moving group MG2 and the position coordinates of the third moving group MG3 do not coincide with each other by using the control unit 30.

As described with reference to FIG. 1, an optical device according to an embodiment may include the optics 10 including the first moving group MG1, the second moving group MG2, and the third moving group MG3 that are sequentially arranged in the direction from the object O toward the image I and may move along the optical axis OA, the plurality of actuators A1, A2, and A3 for respectively moving the first to third moving groups MG1, MG2, and MG3 along the optical axis OA, and the control unit 30 that controls the positions of the first to third moving groups MG1, MG2, and MG3 by operating the actuators A1, A2, and A3.

In the driving control method according to an embodiment of the present invention, the position coordinates of the second moving group MG2 and the position coordinates of the third moving group MG3 are determined based on one integrated coordinates system, and, when zooming or the like is performed, the second moving group MG2 and the third moving group MG3 are moved, such that the position coordinates of the second moving group MG2 and the position coordinates of the third moving group MG3 do not coincide with each other. Therefore, the second moving group MG2 and the third moving group MG3 are prevented from colliding with each other.

Hereinafter, operation S100 for calculating a relationship formula between the position coordinates of the second moving group MG2 and the position coordinates of the third moving group MG3 in one integrated coordinates system will be described in detail.

Figure 4A:
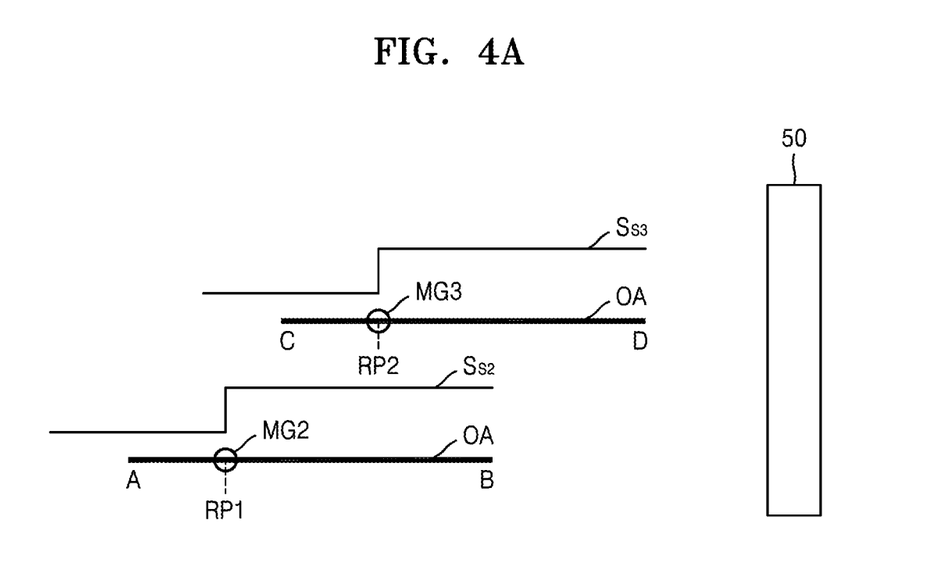
FIGS. 4A through 4G are diagrams sequentially showing operations constituting operation S100 of FIG. 3 according to an embodiment.
Figure 4B:
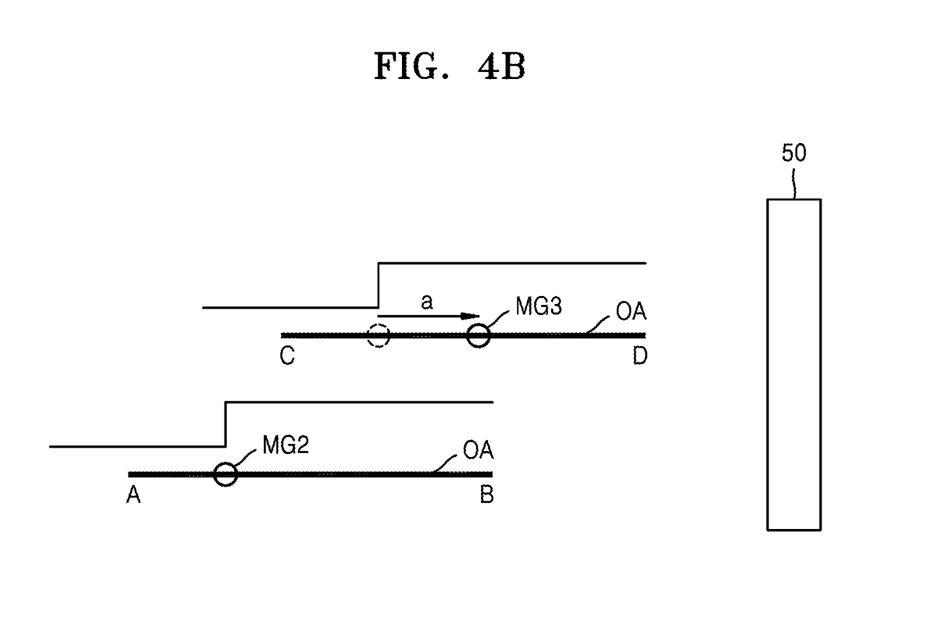
Figure 4C:
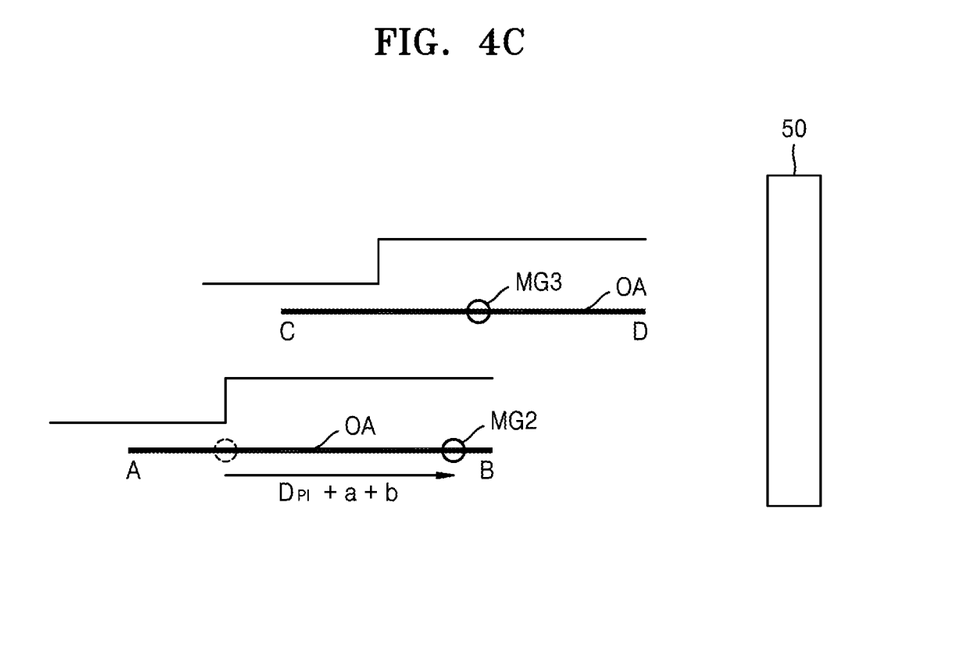
Figure 4D:
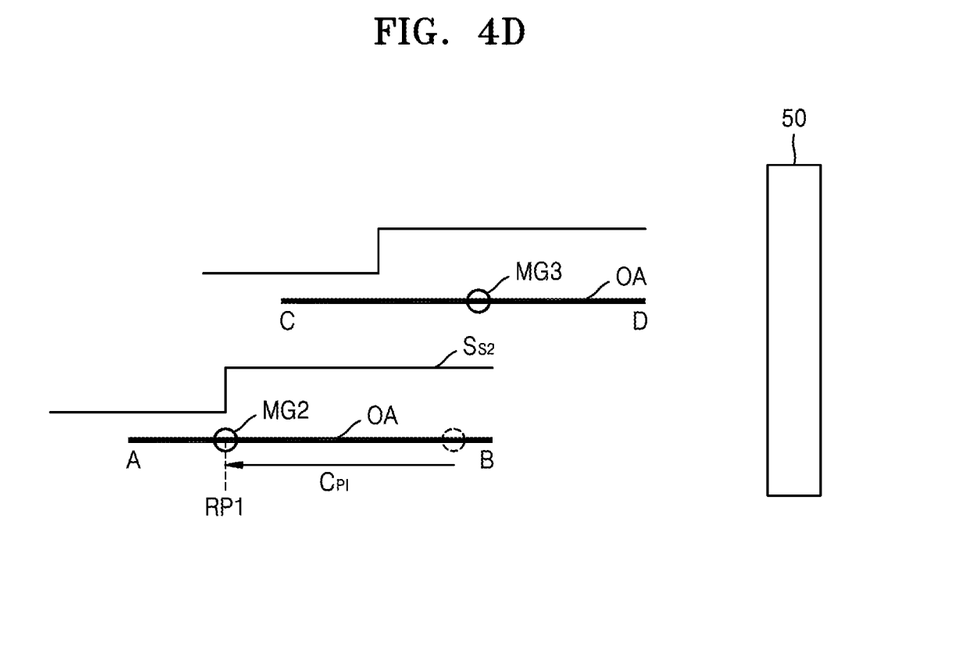
Figure 4E:
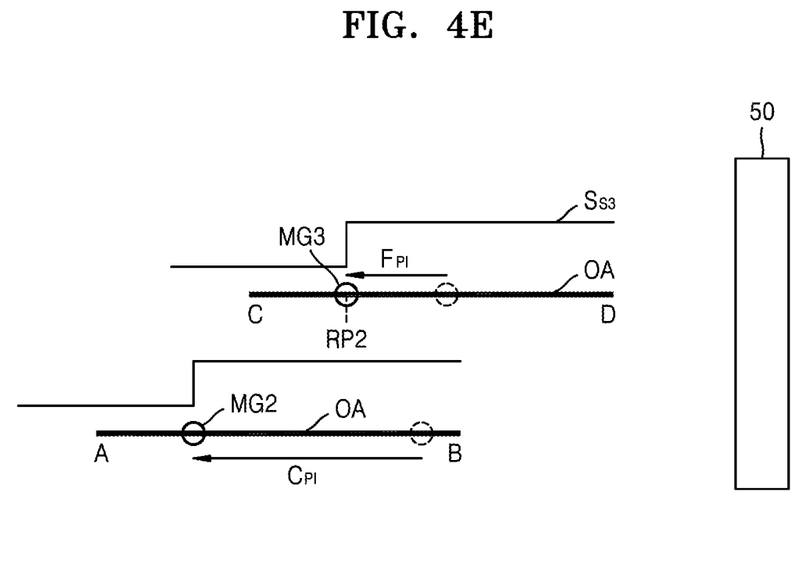
Figure 4F:
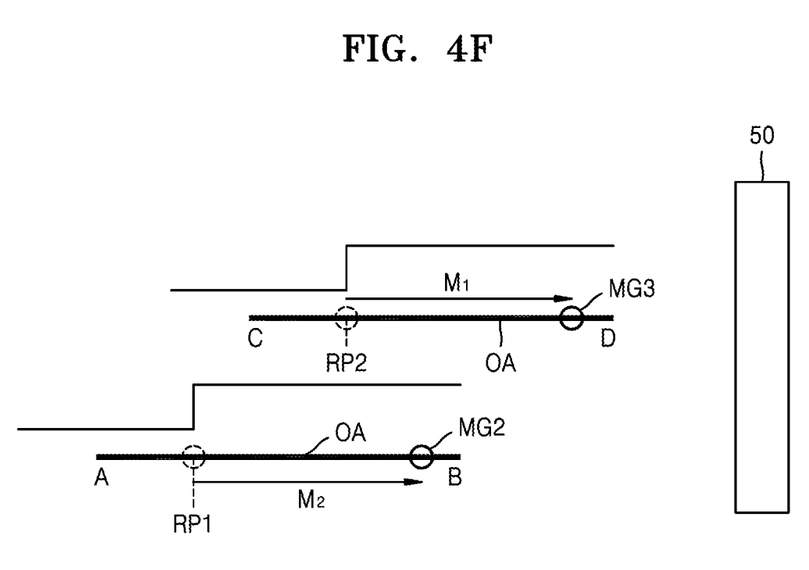
Figure 4G:
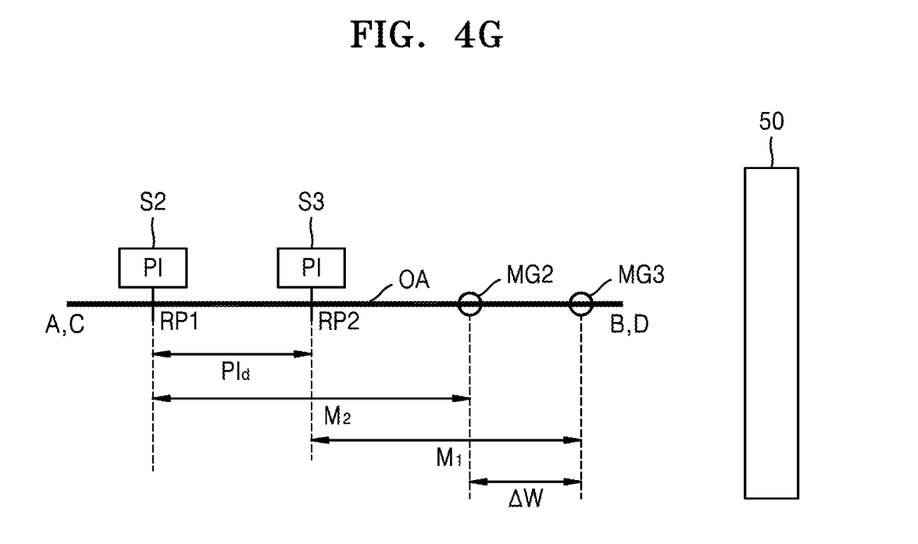

FIGS. 4A through 4G are diagrams sequentially showing operations constituting operation S100 of FIG. 3 according to an embodiment. Although the second moving group MG2 and the third moving group MG3 arranged on the optical axis OA are shown on different layers in FIGS. 4A to 4F, it is merely for convenience of explanation, and the second moving group MG2 and the third moving group MG3 are actually arranged on a same optical axis OA as shown in FIG. 4G.

In FIGS. 4A to 4G, the reference numerals A, B, C, and D denote a telephoto end, a wide-angle end, a near focus position, and a far focus position, respectively. For example, in the driving region DR1 (FIG. 2) of the second moving group MG2, the end far from the image sensor 50 may correspond to the telephoto end and the end close to the image sensor 50 may correspond to the wide-angle end. In the driving region DR2 (FIG. 2) of the third moving group MG3, the end far from the image sensor 50 may correspond to the near focus position and the end far from the image sensor 50 may correspond to the far focus position. However, the present invention is not limited thereto, and the telephoto end, the wide-angle end, the near focus position, and the far focus position may vary depending on the configuration of designed optics.

FIG. 4A shows a state in which the second moving group MG2 and the third moving group MG3 are arranged at a first reference position RP1 and a second reference position RP2, respectively. The reference positions RP1 and RP2 correspond to positions at which signals $S_{S2}$ and $S_{S3}$ of PI sensors S2 and S3 are switched from low to high or from high to low.

FIG. 4B shows a state in which the third moving group MG3 is moved by a distance a along the optical axis OA in a direction away from the second moving group MG2. FIG. 4C shows a state in which the second moving group MG2 is moved by a distance $D_{PI}$+a+b toward the third moving group MG3, and, after the second moving group MG2 is moved, the second moving group MG2 and the third moving group MG3 contact each other. In other words, the second moving group MG2 may move from the first reference position RP1 until the second moving group MG2 contacts the third moving group MG3.

Here, $D_{PI}$ denotes a distance between the PI sensor S2 (FIG. 1) disposed at the first reference position RP1 of the second moving group MG2 and the PI sensor S3 (FIG. 1) disposed at the second reference position RP2 of the third moving group MG3. Here, $D_{PI}$ may correspond to a designed distance between two PI sensors S2 and S3. In FIG. 4B, "a" denotes a distance that the third moving group MG3 is moved and "b" denotes a distance that the third moving group MG3 is further moved until the second moving group MG2 and the third moving group MG3 contact each other. Generally, each of the PI sensors S2 and S3 may have a measurement error up to about 0.5 mm, and the sum of errors of the two PI sensors S2 and S3 may be up to about 1 mm. b is a value reflecting such errors. When the sensing direction of the PI sensors S2 and S3 is a direction from the image sensor 50 toward an object, b has a positive (+) value.

Also, in FIG. 4C, the second moving group MG2 might not move until the position of the second moving group MG2 completely coincide with that of the third moving group MG3 and may only move to a position at which the most image-side surface of the second moving group MG2 contacts the most object-side surface of the third moving group MG3. The above-stated operations are consequently reflected to a relationship formula between the second moving group MG2 and the third moving group MG3 in the integrated coordinates system. Therefore, the position coordinates of the second moving group MG2 and the position coordinates of the third moving group MG3 are the same does not mean that the most object-side surface of the second moving group MG2 overlaps the most object-side surface of the third moving group MG3, but means that there is a physical positional difference therebetween corresponding to the thickness of the second moving group MG2.

FIG. 4D shows a state in which the second moving group MG2 is moved back to the first reference position RP1. Here, a moving distance of the second moving group MG2 may be denoted by $C_{PI}$, and the second moving group MG2 may be disposed at the first reference position RP1 by moving the second moving group MG2 until a time point at which the signal $S_{S2}$ of the PI sensor S2 is changed. FIG. 4E shows a state in which the third moving group MG3 is moved back to the second reference position RP2. Here, a moving distance of the third moving group MG3 may be denoted by $F_{PI}$, and the third moving group MG3 may be disposed at the second reference position RP2 by moving the third moving group MG3 until a time point at which the signal $S_{S3}$ of the PI sensor S3 is changed.

Through the operations shown in FIGS. 4A through 4E, an error-corrected difference $PI_d$ (FIG. 4G) between the first reference position RP1 of the second moving group MG2 and the second reference position of the third moving group MG3 may be calculated. The difference $PI_d$ may correspond to a difference between $C_{PI}$ and $F_{PI}$.

Referring to FIG. 4F, a first movement amount $M_1$ may be obtained by moving the third moving group MG3 from the second reference position RP2 to the far focus position, and then the second movement amount $M_2$ may be obtained by moving the second moving group MG2 from the first reference position RP1 to the wide-angle end. Although FIG. 4F shows that the wide-angle end is a B position and the far focus position is a D position, the present invention is not limited thereto.

The wide-angle end and the far focal position correspond to initialization positions of the second moving group MG2 and the third moving group MG3, respectively, and the second moving group MG2 and the third moving group MG3 may be moved for zooming or the like by the control unit 30 (FIG. 1) after being moved to the initialization positions.

Referring to FIG. 4G, a difference $\Delta W$ between the position coordinates of the second moving group MG2 and the position coordinates of the third moving group MG3 at the initialization positions may be calculated according to Formula 1 below.

$$\Delta W = M_2 - (M_1 - PI_d) \qquad \text{[Formula 1]}$$

Here, $M_1$ denotes a first movement amount obtained by moving the third moving group MG3 from the second reference position RP2 to the far focus position, $M_2$ denotes a second movement amount obtained by moving the second moving group MG2 from the first reference position RP1 to the wide-angle end, and $PI_d$ denotes an error-corrected difference between the first reference position RP1 of the second moving group MG2 and the second reference position RP2 of the third moving group MG3. The first reference position RP1 and the second reference position RP2 may correspond to positions where the PI sensors S2 and S3 are disposed, respectively.

A relationship formula between the position coordinates of the second moving group MG2 and the position coordinates of the third moving group MG3 may be calculated from the difference $\Delta W$, as shown in Formula 2 below.

$$X_2 = X_3 \pm |\Delta W| \qquad \text{[Formula 2]}$$

here, $X_2$ denotes a position coordinates of the third moving group MG3 in the integrated coordinates system, and $\Delta W$ denotes a difference between the position coordinates of the second moving group MG2 at the wide-angle end and the position coordinates of the third moving group MG3 at the far focus position.

In Formula 2, "−" indicates that the position coordinates of the second moving group MG2 is smaller than the position coordinates of the third moving group MG3 by $|\Delta W|$ when the position coordinates value of the integrated coordinates system gradually increases in the direction from an object toward an image, and "+" Indicates that the position coordinates of the second moving group MG2 is greater than the position coordinates of the third moving group MG3 by $|\Delta W|$ when the position coordinates value of the integrated coordinates system gradually increases in the direction from the image toward the object.

Through the operations shown in FIGS. 4A to 4G, a relationship formula between the position coordinates of the second moving group MG2 and the position coordinates of the third moving group MG3 in the integrated coordinates system is calculated. The control unit 30 may prevent the second moving group MG2 and the third moving group MG3 from colliding with each other by controlling movements of the second moving group MG2 and the third moving group MG3 based on the integrated coordinates system.

However, the operations shown in FIGS. 4A to 4G are merely examples, and the relationship between the position coordinates of the second moving group MG2 and the position coordinates of the third moving group MG3 in the integrated coordinates system may be calculated through various operations different from those shown in FIGS. 4A to 4G.

Figure 5A:
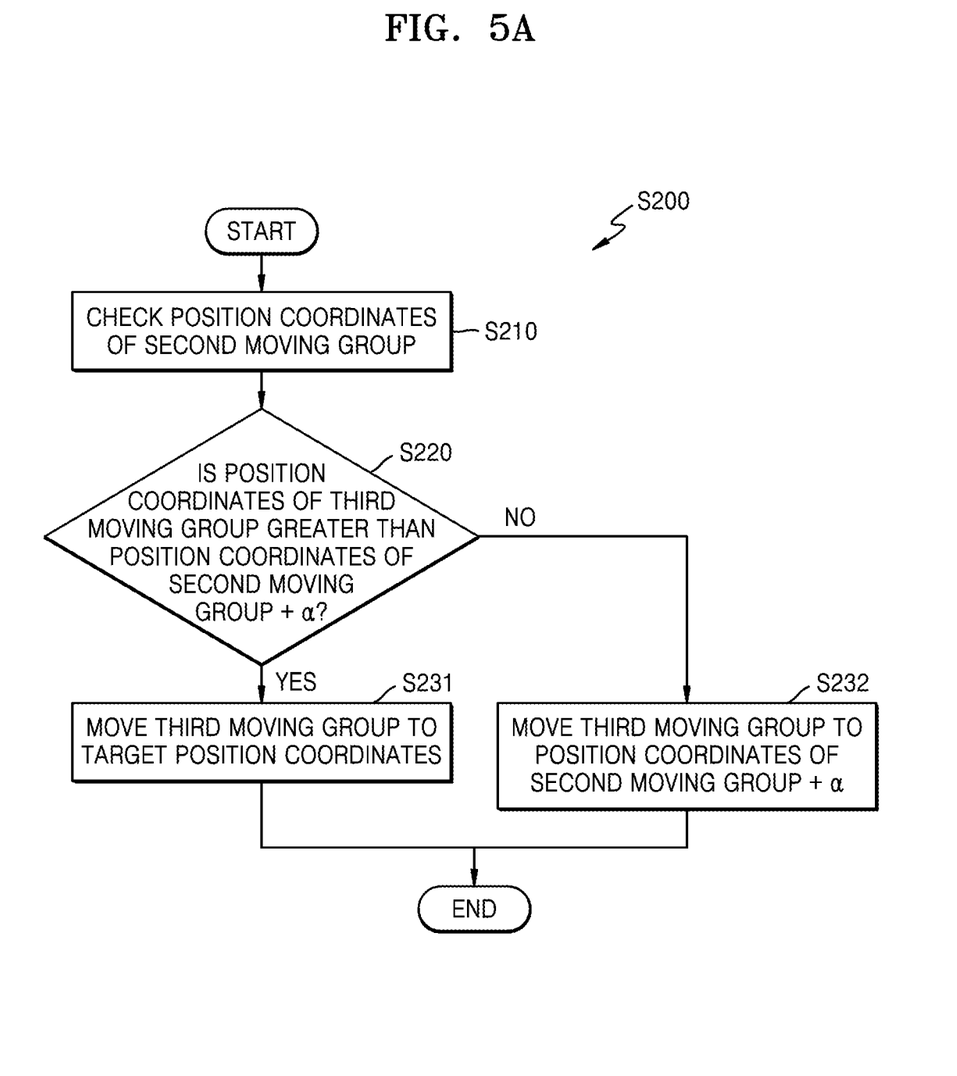
FIGS. 5A and 5B are diagrams showing operations constituting operation S200 of FIG. 3 according to an embodiment.
Figure 5B:
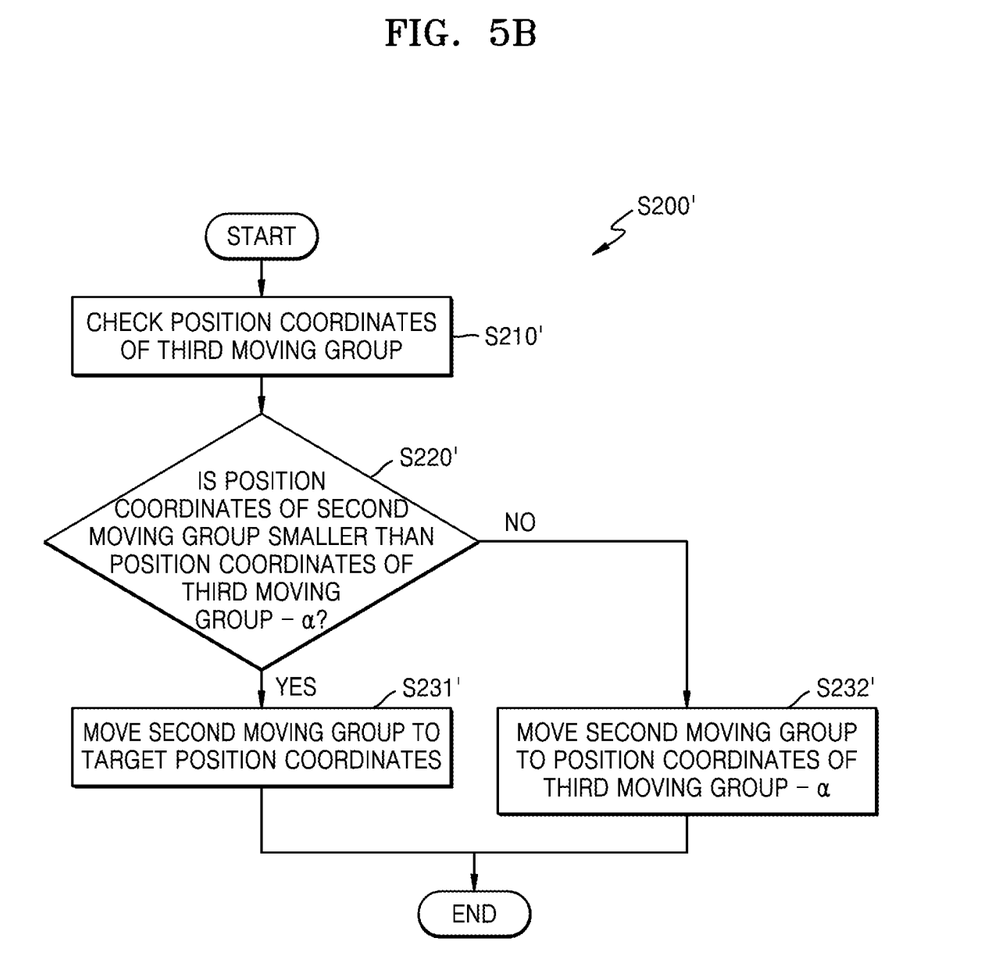

FIGS. 5A and 5B are diagrams sequentially showing operations constituting operation S200 of FIG. 3 according to an embodiment. Hereinafter, the operations of FIGS. 5A and 5B will be described with reference to the components of the optical device of FIG. 1.

FIG. 5A shows a case in which the third moving group MG3 is moved by the control unit 30 while the second moving group MG2 is fixed, and FIG. 5B shows a case in which the second moving group MG2 is moved by the control unit 30 while the third moving group MG3 is fixed.

Referring to FIG. 5A, operation S200 for moving the second moving group MG2 and the third moving group MG3 by using the control unit 30 to prevent the position coordinates of the second moving group MG2 and the position coordinates of the third moving group MG3 from coinciding with each other may include operation S210 for checking the position coordinates of the second moving group MG2 and operation S220 for determining whether the position coordinates of the third moving group MG3 is greater than the position coordinates of the second moving group MG2+α. When the position coordinates of the third moving group MG3 is greater than the position coordinates of the second moving group MG2+α (Yes), operation S231 for moving the third moving group MG3 to a target position coordinates may be performed. When the position coordinates of the third moving group MG3 is not greater than the position coordinates of the second moving group MG2+α (No), operation S232 for moving the third moving group MG3 to the position coordinates of the second moving group MG2+α may be performed.

α is a value greater than 0. When the third moving group MG3 is moved toward the second moving group MG2 as much as possible, the position coordinates of the third moving group MG3 becomes the position coordinates of the second moving group MG2+α. in other words, it is not possible for the position coordinates of the second moving group MG2 and the position coordinates of the third moving group MG3 to coincide with each other, and thus the second moving group MG2 and the third moving group MG3 might not collide with each other.

The value α may have a predetermined value capable of assuring prevention of the second moving group MG2 and the third moving group MG3 from colliding with each other by taking mechanical errors of the optical device and shaking of the optical device into account.

Referring to FIG. 5B, operation S200' for moving the second moving group MG2 and the third moving group MG3 by using the control unit 30 to prevent the position coordinates of the second moving group MG2 and the position coordinates of the third moving group MG3 from coinciding with each other may include operation S210' for checking the position coordinates of the third moving group MG3 and operation S220' for determining whether the position coordinates of the second moving group MG2 is smaller than the position coordinates of the third moving group MG3−α. When the position coordinates of the second moving group MG2 is smaller than the position coordinates of the third moving group MG3−α (Yes), operation S231' for moving the second moving group MG2 to a target position coordinates may be performed. When the position coordinates of the second moving group MG2 is not smaller than the position coordinates of the third moving group MG3−α (No), operation S232' for moving the second moving group MG2 to the position coordinates of the third moving group MG3−α may be performed.

α is a value greater than 0. When the second moving group MG2 is moved toward the third moving group MG3 as much as possible, the position coordinates of the second moving group MG2 becomes the position coordinates of the third moving group MG3−α. in other words, it is not possible for the position coordinates of the third moving group MG3 and the position coordinates of the second moving group MG2 to coincide with each other, and thus the third moving group MG3 and the second moving group MG2 might not collide with each other.

The value α may have a predetermined value capable of assuring prevention of the second moving group MG2 and the third moving group MG3 from colliding with each other by taking mechanical errors of the optical device and shaking of the optical device into account.

Although not shown, in the case where both the second moving group MG2 and the third moving group MG3 need to be moved, target position coordinates of the second moving group MG2 and the third moving group MG3 may be compared with each other and the second moving group MG2 and third moving group MG3 may be moved at the same time. When the target position coordinates are compared and a driving region in which the second moving group MG2 moves and a driving region in which the third moving group MG3 moves overlap, a moving group having higher priority may be moved first, and a moving group having lower priority may be moved according to the operations of FIG. 5A or 5B.

Figure 6:
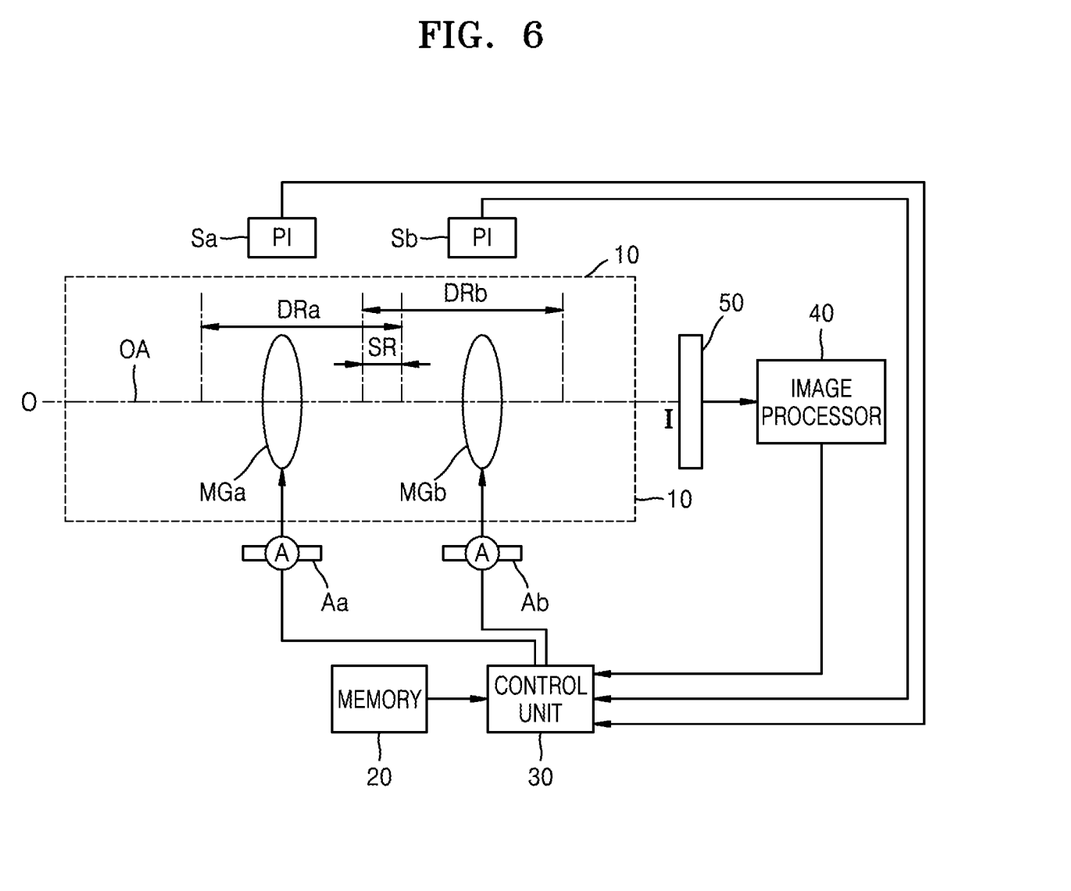
FIG. 6 is a schematic diagram showing an optical device according to another embodiment of the present invention.

FIG. 6 is a schematic diagram showing an optical device according to another embodiment of the present invention.

Hereinafter, descriptions of the optical device shown in FIG. 6 will focus on differences from the optical device shown in FIG. 1. Since the components of FIG. 6 denoted by the same reference numerals as those of FIG. 1 have substantially the same configuration as the components of FIG. 1, detailed descriptions thereof will be omitted. Referring to FIG. 6, an optical device according to an embodiment includes the optics 10 including two moving groups MGa and MGb that are movable along the optical axis OA, two actuators Aa and Ab for respectively moving the two moving groups MGa and MGb along the optical axis OA, and the control unit 30 that controls the positions of the two moving groups MGa and MGb by operating the two actuators Aa and Ab.

The optical device further includes the memory 20 for storing data representing design positions of the two moving groups MGa and MGb according to zoom positions, and the control unit 30 may move the two moving groups MGa and MGb by using such data.

It may be detected by PI sensors Sa and Sb whether the two moving groups MGa and MGb are located at reference positions, and at least one of the PI sensors Sa and Sb may be omitted.

The optics 10 includes the two moving groups MGa and MGb arranged on the optical axis OA in a direction from the object O to the image I, and driving regions of the two moving groups MGa and MGb may overlap each other. In other words, the two moving groups MGa and MGb include driving regions DRa and DRb in which the two moving groups MGa and MGb may move along the optical axis OA, and the driving regions DRa and DRb may include a shared region SR in which the driving regions DRa and DRb partially overlap each other.

Although not shown, the optics 10 may further include at least one fixed group having a fixed position and/or at least one moving group of which a driving region does not overlap, in addition to the two moving groups MGa and MGb. Also, there may be three or more moving groups of which driving regions overlap one another.

The position coordinates of the two moving groups MGa and MGb sharing the driving regions DRa and DRb may be determined by one integrated coordinates system. Here, the integrated coordinates system refers to one coordinates system that defines the position coordinates of the two moving groups MGa and MGb. As the difference between the position coordinates of the two moving groups MGa and MGb increases, the physical distance between the two moving groups MGa and MGb increases. In other words, the position coordinates of the two moving groups MGa and MGb may satisfy a certain relationship formula.

When the position coordinates of the two moving groups MGa and MGb are the same, the two moving groups MGa and MGb collide with each other. Therefore, the control unit 30 may move the two moving groups MGa and MGb to prevent the position coordinates of the two moving groups MGa and MGb from coinciding with each other.

Since detailed descriptions thereof have been given above, the descriptions will not be repeated here.

Figure 7:
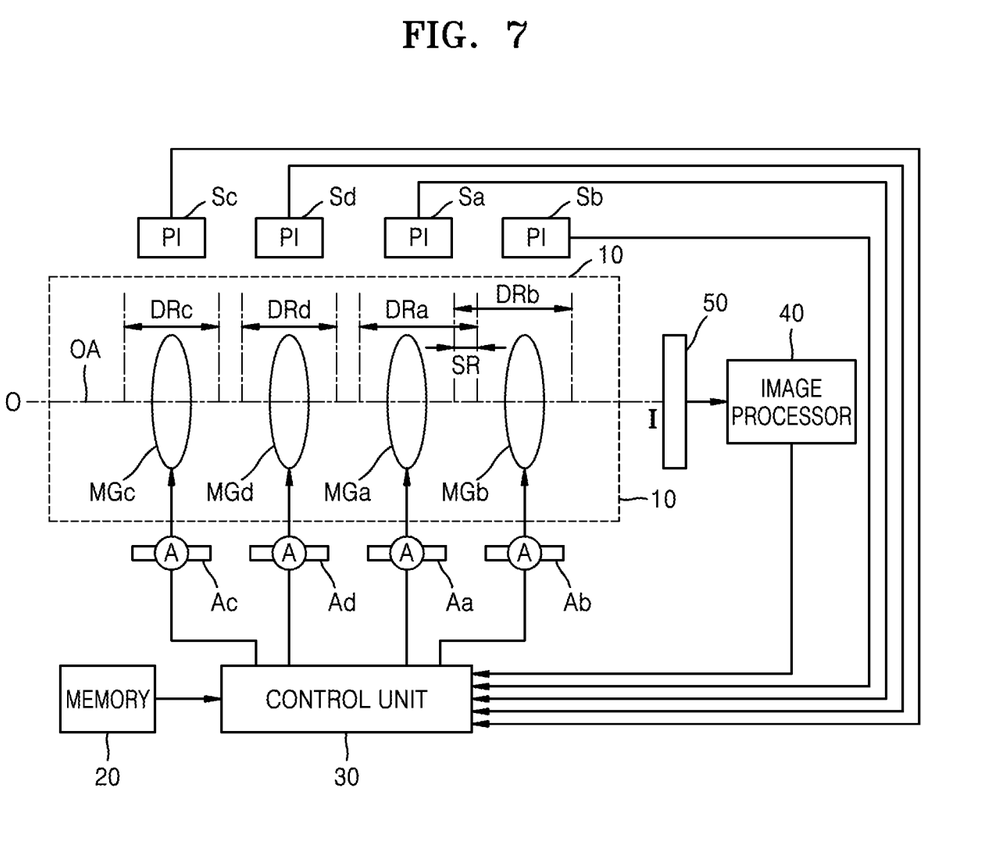
FIG. 7 is a schematic diagram showing an optical device according to another embodiment of the present invention.

FIG. 7 is a schematic diagram showing an optical device according to another embodiment of the present invention.

Hereinafter, descriptions of the optical device shown in FIG. 7 will focus on differences from the optical device shown in FIG. 1. Since the components of FIG. 7 denoted by the same reference numerals as those of FIG. 1 have substantially the same configuration as the components of FIG. 1, detailed descriptions thereof will be omitted.

Referring to FIG. 7, an optical device according to an embodiment includes the optics 10 including four moving groups MGa, MGb, MGc, and MGd that are movable along the optical axis OA, four actuators Aa, Ab, Ac, and Ad for respectively moving the four moving groups MGa, MGb, MGc, and MGd along the optical axis OA, and the control unit 30 that controls the positions of the four moving groups MGa, MGb, MGc, and MGd by operating the four actuators Aa, Ab, Ac, and Ad.

The optical device further includes the memory 20 for storing data representing design positions of the four moving groups MGa, MGb, MGc, and MGd according to zoom positions, and the control unit 30 may move the four moving groups MGa, MGb, MGc, and MGd by using such data.

It may be detected by PI sensors Sa, Sb, Sc, and Sd whether the four moving groups MGa, MGb, MGc, and MGd are located at reference positions, and at least one of the PI sensors Sa, Sb, Sc, and Sd may be omitted.

Driving regions of some of the four moving groups MGa, MGb, MGc, and MGd may overlap with one another, and driving regions of some of the four moving groups MGa, MGb, MGc, and MGd might not overlap with one another. FIG. 7 shows an embodiment in which two moving groups MGa and MGb share driving regions with each other and the other two moving groups MGc and MGd have driving regions that do not overlap with those of the other moving groups.

In other words, the two moving groups MGa and MGb include driving regions DRa and DRb in which the two moving groups MGa and MGb may move along the optical axis OA, and the driving regions DRa and DRb may include a shared region SR in which the driving regions DRa and DRb partially overlap each other. The other two moving groups MGc and MGd also include driving regions DRc and DRd in which the two moving groups MGc and MGd may move along the optical axis OA. Since the driving regions DRc and DRd do not overlap driving regions of the other moving groups, each of the two moving group MGc and MGd will not collide with the other moving groups.

The position coordinates of the two moving groups MGa and MGb sharing the driving regions DRa and DRb may be determined by one integrated coordinates system. Here, the integrated coordinates system refers to one coordinates system that defines the position coordinates of the two moving groups MGa and MGb. As the difference between the position coordinates of the two moving groups MGa and MGb increases, the physical distance between the two moving groups MGa and MGb increases. In other words, the position coordinates of the two moving groups MGa and MGb may satisfy a certain relationship formula.

When the position coordinates of the two moving groups MGa and MGb are the same, the two moving groups MGa and MGb collide with each other. Therefore, the control unit 30 may move the two moving groups MGa and MGb to prevent the position coordinates of the two moving groups MGa and MGb from coinciding with each other.

Since the driving regions of the other two moving groups MGc and MGd do not overlap those of the other moving groups, position coordinates of the other two moving groups MGc and MGd may be determined by independent coordinates systems, respectively. For example, the position coordinates of the two moving groups MGc and MGd of which the driving regions do not overlap may be determined by a first coordinates system and a second coordinates system, respectively, and position coordinates of the two moving groups MGa and MGb of which the driving regions overlap each other may be determined by a third coordinates system, which is one integrated coordinates system.

Although FIG. 7 shows a case in which the two moving groups MGa and MGb sharing driving regions are arranged close to the image I, the present invention is not limited thereto.

Also, according to another embodiment, more fixed groups and/or moving groups may be further provided in addition to the moving groups shown in FIG. 7, and driving regions of three or more moving groups may overlap one another.

According to the embodiments described above, an optical device that may be miniaturized by designing at least two moving groups MG2 and MG3 to share driving regions with each other and a driving control method for the optical device may be provided. Also, an optical device capable of preventing the moving groups MG2 and MG3 sharing driving regions with each other from colliding with each other during movements by integrating coordinates systems of the moving groups MG2 and MG3 and controlling movements of the moving groups MG2 and MG3 based on an integrated coordinates system and a driving control method for the optical device may be provided.

The driving control method according to an embodiment of the present disclosure may be implemented as computer-readable code on a computer-readable recording medium. The computer-readable recording medium includes all kinds of recording apparatuses in which data that may be read by a computer system is stored. Examples of the computer-readable recording medium include ROM, RAM, a CD-ROM, magnetic tape, a floppy disk, an optical data storage, etc. The computer-readable recording medium can also be distributed over network-coupled computer systems so that the computer-readable code is stored and executed in a distributed fashion. In addition, functional programs, code, and code segments for implementing the present disclosure may be easily inferred by programmers of the technical field to which the present disclosure belongs.

While the inventive concept has been described with reference to exemplary embodiments, it is to be understood that the inventive concept is not limited to the disclosed example embodiments, but, on the contrary, is intended to cover various modifications and equivalent arrangements included within the spirit and scope of the appended claims. Accordingly, the true scope of protection of the present disclosure should be determined by the technical idea of the appended claims.

INDUSTRIAL APPLICABILITY

At least one of embodiments of the present invention may be used for an optical device and a driving control method for the optical device.

The invention claimed is:

1. An optical device comprising:
an optics comprising at least two moving groups that are movable along an optical axis and share portions of driving regions;
a plurality of actuators configured to move the at least two moving groups along the optical axis, respectively; and
a control unit configured to control positions of the at least two moving groups by operating the actuators,
wherein the control unit is configured to move the at least two moving groups independently such that position coordinates of the at least two moving groups in one integrated coordinate system do not have a same value which makes a position of the most image-side surface of one of the at least two moving groups coincide with a position of the most object-side surface of the other of the at least two moving groups, wherein the at least two moving groups comprise a second moving group and a third moving group that are sequentially disposed from an object side to an image plane side, and wherein, in the integrated coordinates system, the position coordinates of the second moving group satisfies the following formula:

$$X_2 = X_3 \pm |\Delta W|$$

where, $X_3$ denotes a position coordinates of the third moving group in the integrated coordinates system, and $\Delta W$ denotes a difference between the position coordinates of the second moving group at the wide-angle end and the position coordinates of the third moving group at the far focus position.

2. The optical device of claim 1, further comprising a first moving group that does not share a driving region with the at least two moving groups and is movable along the optical axis.

3. The optical device of claim 2, wherein the position coordinates of the first moving group are defined based on an independent coordinate system different from the integrated coordinate system.

4. The optical device of claim 2, wherein the first moving group, the second moving group, and the third moving group are a zoom lens group, a compensation lens group, and a focus lens group, respectively, and wherein the optical device further comprises:
a first fixed group that is disposed closest to an object and has a fixed position; and
a second fixed group that is disposed between the first moving group and the second moving group and has a fixed position.

5. The optical device of claim 1, wherein the integrated coordinate system refers to one coordinate system defining the position coordinates of the at least two moving groups.

6. The optical device of claim 1, wherein the greater is a difference in the position coordinates of the at least two moving groups, the greater is a physical distance between the at least two moving groups.

7. The optical device of claim 1, further comprising two moving groups that do not share a driving region with the at least two moving groups and are movable along the optical axis.

8. The optical device of claim 7, wherein the position coordinates of the two moving groups that do not share driving regions with the at least two moving groups are defined based on an independent coordinate system different from the integrated coordinate system.

9. The optical device of claim 1, wherein the control unit is configured to move the at least two moving groups by calculating a positional relationship between the at least two moving groups in the integrated coordinate system based on differences between the position coordinates and physical positions due to thickness differences between the at least two moving groups.

10. A driving control method for an optical device comprising at least two moving groups that are movable along an optical axis and share portions of driving regions, the driving control method comprising:

calculating a relationship formula between position coordinates of the at least two moving groups in one integrated coordinate system; and moving each of the at least two moving groups by using a control unit of the optical device such that the position coordinates of the at least two moving groups do not have a same value which makes a position of the most image-side surface of one of the at least two moving groups coincide with a position of the most object-side surface of the other of the at least two moving groups, wherein the at least two moving groups comprise a second moving group and a third moving group that are sequentially disposed from an object side to an image plane side, and wherein the position coordinates of the second moving group and the position coordinates of the third moving group satisfy the following relationship formula:

$$X_2 = X_3 \pm |\Delta W|$$

where, $X_2$ and $X_3$ denote position coordinates of the second moving group and position coordinates of the third moving group in the integrated coordinates system, respectively, and $\Delta W$ denotes a difference between the position coordinates of the second moving group at the wide-angle end and the position coordinates of the third moving group at the far focus position.

11. The method of claim 10, wherein the optical device further comprises a first moving group that does not share a driving region with the at least two moving groups and is movable along the optical axis.

12. The method of claim 11, wherein the calculating the relationship formula between the position coordinates of the at least two moving groups comprises:

calculating a difference $PI_d$ between a first reference position of the second moving group and a second reference position of the third moving group;

obtaining a first movement amount $M_1$ while moving the third moving group from the second reference position to a far focal position;

obtaining a second movement amount $M_2$ while moving the second moving group from the first reference position to a wide-angle end;

calculating the difference $\Delta W$ between position coordinates of the second moving group and position coordinates of the third moving group from a formula $\Delta W = M_2 - (M_1 - PI_d)$; and calculating a relationship formula between the position coordinates of the second moving group and the position coordinates of the third moving group from the difference $\Delta W$.

13. The method of claim 10, wherein the relationship formula is calculated based on differences between the position coordinates and physical positions due to thickness differences between the at least two moving groups.

* * * * *